United States Patent
Vissapragada et al.

(10) Patent No.: US 12,099,524 B2
(45) Date of Patent: Sep. 24, 2024

(54) DATABASE SYSTEMS AND RELATED REPLICATION MONITORING METHODS

(71) Applicant: Salesforce, Inc., San Francisco, CA (US)

(72) Inventors: Bharath Vissapragada, Dublin, CA (US); Rushabh Shah, Sunnyvale, CA (US)

(73) Assignee: Salesforce, Inc.

( * ) Notice: Subject to any disclaimer, the term of this patent is extended or adjusted under 35 U.S.C. 154(b) by 0 days.

(21) Appl. No.: 17/806,235

(22) Filed: Jun. 9, 2022

(65) Prior Publication Data

US 2023/0401230 A1 Dec. 14, 2023

(51) Int. Cl.
  *G06F 16/27* (2019.01)
  *G06F 16/23* (2019.01)

(52) U.S. Cl.
  CPC ........ *G06F 16/273* (2019.01); *G06F 16/2365* (2019.01)

(58) Field of Classification Search
  CPC ............................ G06F 16/273; G06F 16/2365
  See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |

(Continued)

*Primary Examiner* — Jensen Hu
(74) *Attorney, Agent, or Firm* — Lorenz & Kopf, LLP

(57) ABSTRACT

Devices, systems and methods are provided for monitoring a replication service replicating data from a source database system to a destination database system. One method involves receiving, at the destination database system from the replication service over a network, a set of database transactions at the source database system, determining an expected tracking entry subsequent to the set of database transactions based at least in part on the one or more tracking entries in the set of database transactions, detecting an anomaly associated with replicating the data from the source database system in response to an absence of receiving, from the replication service, a subsequent set of database transactions at the source database system that includes the expected tracking entry within a threshold period of time, and initiating a remedial action in response to detecting the anomaly.

19 Claims, 6 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,409,587 B2 * | 8/2008 | Perry ................. G06F 11/1474 |
| | | 714/E11.131 |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,121,983 B2 | 2/2012 | Prahlad et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,656,218 B2 * | 2/2014 | Erofeev ................ G06F 16/184 |
| | | 714/15 |
| 11,093,477 B1 * | 8/2021 | Martin ................ G06F 16/2322 |
| 2001/0039586 A1 * | 11/2001 | Primak et al. .......... G06F 15/16 |
| | | 709/228 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2006/0053347 A1 * | 3/2006 | van Ingen ............ G06F 11/1469 |
| | | 714/47.2 |
| 2008/0140734 A1 * | 6/2008 | Wagner .................... G06F 16/27 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0166505 A1 * | 6/2013 | Peretz ................. G06F 11/2041 |
| | | 707/611 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0201563 A1 * | 7/2014 | Callaway ............ G06F 11/2097 |
| | | 714/3 |
| 2016/0092491 A1 * | 3/2016 | Cowling ............. G06F 16/2365 |
| | | 707/624 |
| 2017/0116210 A1 * | 4/2017 | Park .................... G06F 16/2433 |
| 2020/0293502 A1 * | 9/2020 | Tal ........................ G06F 16/21 |
| 2021/0286689 A1 * | 9/2021 | Dehganpour ....... G06F 11/3495 |
| 2021/0326359 A1 * | 10/2021 | Upton .................... G06F 3/067 |
| 2022/0261403 A1 * | 8/2022 | Haile .................. H04L 67/1095 |

* cited by examiner

| RS NAME | WAL NAME | WAL OFFSET | TIMESTAMP |
|---------|----------|------------|-----------|
| RS-0    | WAL-0    | 90         | t0        |
| RS-0    | WAL-1    | 1000       | t0+30     |
| RS-0    | WAL-2    | 100        | t0+60     |

| RS NAME | WAL NAME | WAL LENGTH | WAL STATE | TIMESTAMP |
|---|---|---|---|---|
| RS-0 | WAL-0 | 0 | ACTIVE | 0 |
| RS-0 | WAL-0 | 500 | ROLLING | t0+19 |
| RS-0 | WAL-0 | 500 | ROLLED | t0+20 |
| RS-0 | WAL-1 | 0 | ACTIVE | t0+21 |
| RS-0 | WAL-1 | 1500 | ROLLING | t0+50 |
| RS-0 | WAL-1 | 1500 | ROLLED | t0+51 |
| RS-0 | WAL-2 | 0 | ACTIVE | t0+52 |

FIG. 4

DATABASE SYSTEMS AND RELATED REPLICATION MONITORING METHODS

TECHNICAL FIELD

One or more implementations relate to the field of database systems, and more specifically, to monitoring replication between database systems.

BACKGROUND

Modern software development has evolved towards web applications or cloud-based applications that provide access to data and services via the Internet or other networks. For example, social media platforms and other collaborative web sites allow users to exchange direct messages or form groups for broadcasting messages and collaborating with one another. In business environments and customer relationship management (CRM) contexts, communication platforms facilitate users sharing information about sales opportunities or other issues surrounding products or services and track changes to projects and sales opportunities by receiving broadcast updates about coworkers, files, and other project related data objects.

In practice, backups or other disaster recovery techniques are employed to maintain continuity of service and protect against inadvertent deletion, data corruption or other data loss that could disrupt operations. Existing replication services support copying data from a production environment (or source) to a backup or disaster recovery system; however, scenarios exist where data present at the source is not present at the backup system, or vice versa. Often, replication inconsistencies are not detected until some time has elapsed after the replication problem occurred. For example, a replication anomaly may not be detected until a periodic comparison of hashes of the data maintained at different systems, where the delay between when the problem occurred and when the problem is detected further increases the difficulty of debugging the problem. Detection of replication anomalies is further complicated as the amount of data increases and the replication service is correspondingly scaled up to include multiple worker threads. As a result, the mean time to detect (MTTD) or the mean time to repair (MTTR) a replication anomaly may be more than a few days. Accordingly, it is desirable to reduce the amount of time required to detect and debug a replication anomaly to maintain continuity of service and avoid data loss.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 3 depicts an exemplary log of tracking entries suitable for use with the replication monitoring process of FIG. 2 according to an example implementation;

FIG. 4 depicts an exemplary event tracking table suitable for use with the replication monitoring process of FIG. 2 in conjunction with the tracking entry log of FIG. 3 according to an example implementation;

DETAILED DESCRIPTION

Figure 1:
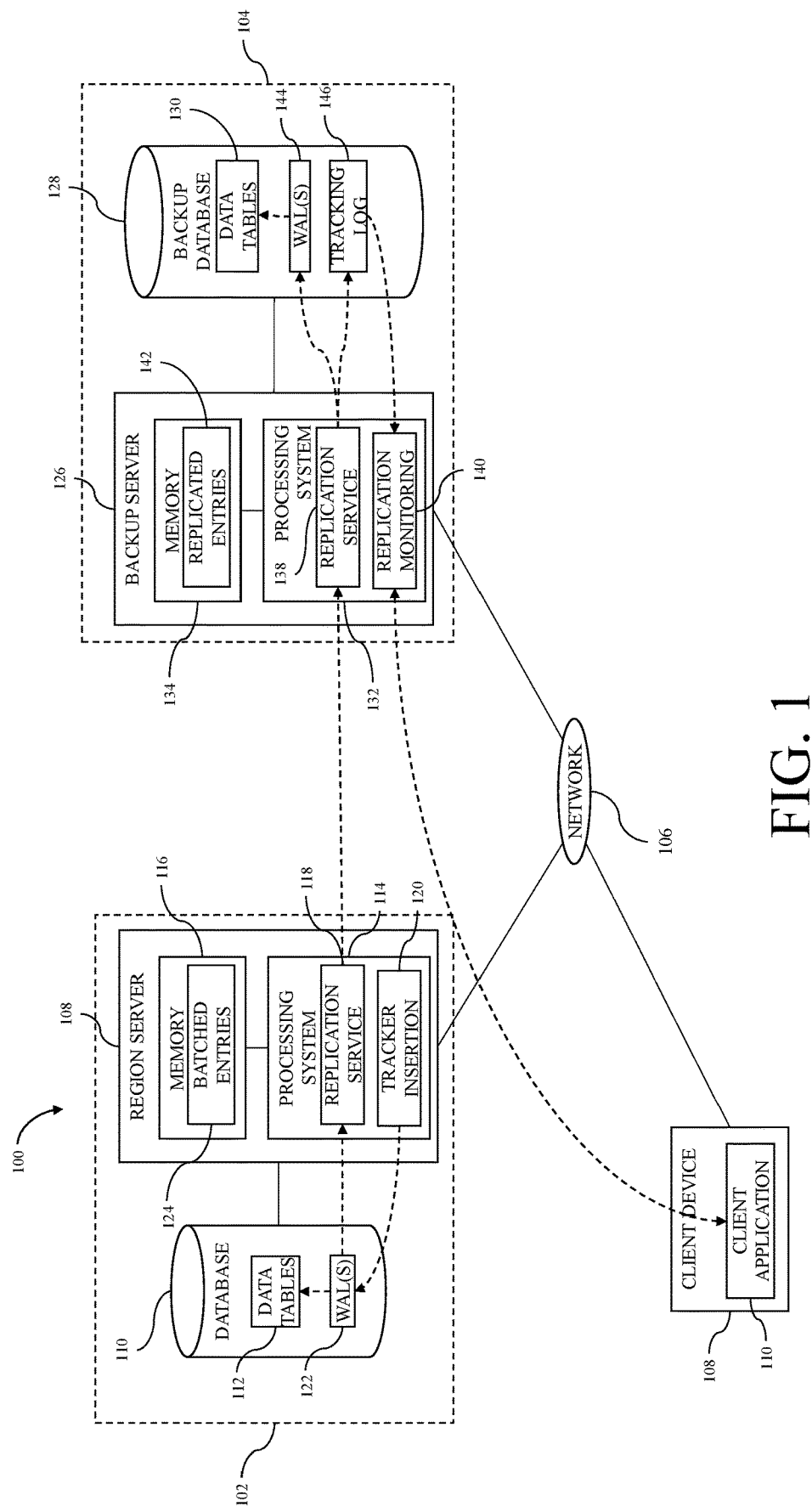
FIG. 1 is a block diagram illustrating a computing system for replicating data between a source and destination that supports a replication monitoring process according to some example implementations.

The following description describes implementations for monitoring data replication to detect replication anomalies closer in time to when they occur to facilitate debugging and initiating remedial action sooner to avoid data loss and maintain continuity of service while reducing mean time to detect (MTTD) and mean time to repair (MTTR). As described in greater detail below, tracking entries (or tracker rows) are inserted into a log of database transactions at a source database system (e.g., a production system) to be replicated by a replication service to a destination database system (e.g., a backup system or a disaster recovery system). At the destination database system, the replicated log of database transactions is received and analyzed to calculate or otherwise determine when tracking entries are expected and detect an anomaly associated with the replication service replicating the log when the expected tracking entry is absent or nonexistent within the replicated log of database transactions at the destination database system within a threshold period of time after when the expected tracking entry was expected to occur. In response to detecting an anomaly associated with the replication based on the absence of an expected tracking entry, one or more remedial actions may be automatically initiated, for example, to apprise a user of the replication anomaly or initiate a repair or other data recovery process to resolve the replication anomaly. In this regard, depending on the frequency at which the tracking entries are inserted and/or the duration of the detection threshold period of time, the subject matter described herein may detect replication anomalies substantially in real-time (e.g., within minutes) to allow replication anomalies to be more quickly resolved or mitigated.

In exemplary implementations described herein, the data replication utilizes write ahead logs (WALs), where after a change (or mutation) to an entry is persisted to a WAL at the source side, a replication service (or a worker thread associated therewith) detects changed (or mutated) entries (alternatively referred to as "tailing" the WAL) and batches the changed entries for replication. Thereafter, the replication service groups the batched entries by table and pushes or otherwise transmits the batched entries to another instance of the replication service at the destination side. To aid debugging, new tracking entries are periodically inserted into the WALs at the source side, such that the tracking entries would be pushed to the destination side after the replication service tails an active WAL and batches the new tracking entries in the active WAL along with the other changed entries in the active WAL. The tracking entries include tracking metadata that includes an identifier associated with the source from where the tracking entry originated (e.g., the name or other identifier associated with a server at the source side), an identifier associated with the WAL into which the tracking entry was inserted (e.g., the name or other identifier associated with the WAL), an offset or other value that indicates where the tracking entry was inserted into the WAL and a timestamp for when the tracking entry was inserted into the WAL. In exemplary implementations, the tracking entries include one or more markers or tags or are otherwise configurable such that the tracking entries do not persist at the source side.

At the destination side, a replication monitoring service monitors or otherwise analyzes the data received from the source-side replication service to identify tracking entries and create a table for maintaining the metadata associated with the identified tracking entries at the destination side. For example, a tracking log at the destination side may be implemented by creating a non-replicated table that includes columns for maintaining the source identifier, the WAL identifier, the offset value and the timestamp associated with a respective tracking entry in association with one another. In this regard, based on the timestamps associated with received tracking entries, the replication monitoring service at the destination side calculates or otherwise determines when the next expected tracking entry originating from a particular source is expected to be received (e.g., the expected timestamp for the next tracking entry plus some buffer time), thereby allowing the replication monitoring service to detect or otherwise identify a replication anomaly in response to the absence of receiving that next expected tracking entry at or within a threshold time period of the expected time of receipt. Thus, by increasing the frequency at which tracking entries are inserted and/or reducing the buffer time in the detection threshold, the replication monitoring service may detect a replication anomaly substantially in real-time (e.g., 15 minutes or less), thereby allowing debugging or other remedial actions to be initiated expeditiously to resolve the replication anomaly.

In exemplary implementations, at the source side, a WAL event tracking table is created that maintains metadata associated with actions or events performed at the source side when instantiating WALs at the source side. For example, once a WAL reaches a threshold length or size or has been active for a threshold duration of time, the replication service at the source side may close the currently active WAL (alternatively referred to as "rolling") and create a new active WAL where subsequent changes to data entries are added to once the previously-active WAL is rolled. A WAL event log at the source side may be implemented by creating a table that includes columns for maintaining an identifier associated with the source (e.g., the name or other identifier associated with a server at the source side), an identifier associated with the WAL associated with the replication event, a value that indicates the length or amount of data maintained in the WAL, a timestamp for when the replication event occurred and a status associated with the WAL at the time of or in response to the replication event. To detect or test for a replication anomaly, a listing of recent WAL events that occurred since a timestamp associated with a most recently-preceding test may be obtained from the WAL event tracking table at the source side, and a corresponding listing of the latest tracking entries associated with the WAL(s) contained in the listing of recent WAL events may be obtained from the tracking log at the destination side. For any active WALs, a replication anomaly may be detected when the difference between the current timestamp and the latest timestamp associated with a tracking entry for the respective active WAL exceeds a detection threshold of time that accounts for replication lag, thereby allowing replication anomalies to be detected while a WAL is still active (e.g., as opposed to waiting to compare hashes after rolling the WAL). Replication anomalies may also be detected with respect to rolled WALs when the difference between the latest timestamp associated with a tracking entry for the respective rolled WAL and the timestamp associated with the state of the WAL changing to rolled exceeds the detection threshold. In this regard, the subject matter described herein is also capable of detecting replication anomalies with respect to rolled WALs that are no longer active.

By virtue of the subject matter described herein, replication anomalies such as the source-side replication service dropping entries during tailing, the source-side replication service dropping entries during batching, or the destination-side replication service not applying entries correctly can be detected, debugged and traced to the source-side or the destination-side, a particular time (or window of time) during which the replication anomaly occurred and/or a particular range of WAL entries that may be affected. Not only does this reduce the MTTD, but the particular time and the particular aspect of the replication that the anomaly is attributable can be better identified, thereby reducing the MTTR to maintain continuity and prevent data loss by increasing the likelihood of all entries being adequately replicated across systems.

FIG. 1 depicts an exemplary computing system 100 for replicating data from a source database system 102 to a destination database system 104 over a communications network 106, such as the Internet or any sort or combination of wired and/or wireless computer network, a cellular network, a mobile broadband network, a radio network, or the like. For example, in one or more implementations, the destination database system 104 is realized as a backup database system or disaster recovery database system that supports ACID (atomicity, consistency, isolation, and durability) properties for database transactions and maintain continuity in the event of unavailability of the source database system 102.

In one or more exemplary implementations, the source database system 102 includes one or more application servers 108 that support an application platform providing instances of virtual applications to any number of client devices over the network 106 that users may interact with, over the network 106, to obtain data or other information from one or more data records maintained in one or more data tables 112 at a database 110 or other repository associated with the source database system 102. For example, the database 110 may maintain, on behalf of a user, tenant or other resource owner, data records entered or created by that resource owner (or users associated therewith), files, objects or other records uploaded by the resource owner (or users associated therewith), and/or files, objects or other records generated by one or more computing processes (e.g., by the server 108 based on user input or other records or files stored in the database 110). In this regard, in one or more implementations, the source database system 102 is realized as an on-demand multi-tenant database system that is capable of dynamically creating and supporting virtual applications based upon data from a common resource database 110 that is shared between multiple tenants, which may alternatively be referred to herein as a multi-tenant database. Data and services generated by the virtual applications may be provided via the network 106 to any number of client devices, as desired, where instances of the virtual application may be suitably generated at run-time (or on-demand) using a common application platform that securely provides access to the data in the database 110 for each of the various tenants subscribing to the multi-tenant system.

The source server 108 generally represents the one or more server computing devices, server computing systems or other combination of processing logic, circuitry, hardware, and/or other components configured to support remote access to data records maintained in the data tables 112 at the database 110 via the network 106. Although not illustrated in FIG. 1, in practice, the source database system 102 may include any number of servers in concert with a load balancer that manages the distribution of network traffic across different servers 108 of the source database system 102. In this regard, the source database system 102 may be realized as a cluster that is configured to support network traffic associated with a particular region (geographic or otherwise), and accordingly, for purposes of explanation, the source server 108 may alternatively be referred to herein as a region server.

In exemplary implementations, the region server 108 generally includes at least one processing system 114, which may be implemented using any suitable processing system and/or device, such as, for example, one or more processors, central processing units (CPUs), controllers, microprocessors, microcontrollers, processing cores, application-specific integrated circuits (ASICs) and/or other hardware computing resources configured to support the operation of the processing system described herein. Additionally, although not illustrated in FIG. 1, in practice, the region server 108 may also include one or more communications interfaces, which include any number of transmitters, receiver, transceivers, wired network interface controllers (e.g., an Ethernet adapter), wireless adapters or another suitable network interface that supports communications to/from the network 106 coupled thereto. The region server 108 also includes or otherwise accesses a data storage element 116 (or memory), and depending on the implementation, the memory 116 may be realized as a random access memory (RAM), read only memory (ROM), flash memory, magnetic or optical mass storage, or any other suitable non-transitory short or long term data storage or other computer-readable media, and/or any suitable combination thereof. In exemplary implementations, the memory 116 stores code or other computer-executable programming instructions that, when executed by the processing system 114, are configurable to cause the processing system 114 to create, generate, or otherwise facilitate a replication service 118 and a tracker insertion service 120 that are configurable to support the subject matter described herein. In this regard, although FIG. 1 depicts the replication service 118 and the tracker insertion service 120 as separate or distinct components, in practice, the tracker insertion service 120 may be integrated, incorporated, or otherwise combined with the replication service 118. Moreover, in practice, the replication service 118 and/or the tracker insertion service 120 may include or otherwise be associated with any number of different worker threads or nodes configurable to support aspects of the functionality of the replication service 118 in parallel or concurrently.

Still referring to FIG. 1, in exemplary implementations, the database 104 is configurable to include or otherwise support one or more WALs 122. In this regard, although FIG. 1 depicts the WALs 122 as being separate from the data tables 112 for purposes of explanation, in practice, the WALs 122 may be implemented or maintained using one or more data tables 112 in the source database 110. As described above, a WAL 122 generally represents a file or other data structure configurable to support a log of changes, edits or other mutations to data records in the data tables 112 of the database 110 before permanently writing the changes to the appropriate data records in the data tables 112 of the database 110. The replication service 118 (or a worker thread associated therewith) analyses (or tails) an active WAL 122 to detect or otherwise identify new entries corresponding to changes to data records in the data tables 112, and when new entries to the WAL 122 are detected, the replication service 118 copies or batches the new entries and stores the batched entries 124 in the memory 116 for subsequent replication. The replication service 118 (or a worker thread associated therewith) periodically pushes or otherwise transmits the batched entries 124 over the network 106 to a counterpart replication service at the destination database system 104 (e.g., the destination replication service 138).

The tracker insertion service 120 is configurable to periodically insert tracking entries into an active WAL 122 that include replication tracking metadata, such as a name or identifier associated with the region server 108 and/or the source database system 102, a name or identifier associated with the active WAL 122 to which the replication tracking metadata is being inserted, an offset value that indicates where a respective tracking entry is inserted into the WAL 122 relative to other entries in the WAL 122 and a timestamp corresponding to the time when the tracking entry was created and inserted into the WAL 122. In exemplary implementations, the tracker insertion service 120 also tags, marks, or otherwise configures the tracking entries such that the tracking entries do not persist at the source database system 102 while allowing the destination replication service 138 to persist the tracking entries at the destination database system 104.

In exemplary implementations, the replication service 118 and/or the tracker insertion service 120 is configurable to create a WAL event tracking table at the source database system 102 (e.g., as a data table 112 in the database 110) that maintains metadata associated with actions or events performed with respect to managing the WALs 122 at the source database system 102. For example, once an active WAL 122 reaches a threshold length or size of data entries, or the duration for which the active WAL 122 has been active is greater than a threshold duration of time, the replication service 118 may close (or roll) the currently active WAL 122 and create a new active WAL 122 where subsequent changes to data entries are added instead of the previously-active WAL 122, which is now rolled. The WAL event tracking table maintains a log of the WAL events and includes columns for the WAL event tracking metadata including the name or identifier associated with the region server 108 and/or the source database system 102, the name or identifier associated with the WAL 122, a value that indicates the length or amount of data maintained in the WAL 122 at the time of the event, a timestamp for when the WAL event occurred, and a state or status change associated with the WAL at the time of or in response to the event (e.g., active, rolling, or rolled). For example, when the replication service 118 initiates rolling of an active WAL 122, the replication service 118 may create a WAL event tracking entry that indicates the status of the WAL 122 as "rolling" and includes a timestamp associated with initiating the rolling, and once the rolling of the WAL 122 is completed, the replication service 118 may create a subsequent WAL event tracking entry that indicates the status of the WAL 122 as "rolled" and includes a timestamp associated with completion of the rolling and another WAL event tracking entry that includes the name or identifier of the newly created active WAL 122 that indicates the status of the newly created WAL 122 as "active" and includes a timestamp associated with creating or instantiating the new active WAL 122.

Still referring to FIG. 1, in exemplary implementations, the destination database system 104 is realized as a backup database system that corresponds to the source database system 102. In this regard, the backup database system 104 similarly includes one or more servers 126 capable of supporting an application platform providing instances of virtual applications to any number of client devices over the network 106 to obtain data or other information from one or more data records maintained in one or more data tables 130 at a backup database 128 or other repository associated with the backup database system 104. It should be noted that in practice, the backup database system 104 may be configurable to support any number of different instances of the source database system 102. For example, a production environment may include numerous different clusters or instances of the source database system 102 distributed at various different geographic locations or regions, which are all supported by a common backup database system 104.

In a similar manner as described above, the destination server 126 generally represents the one or more server computing devices, server computing systems or other combination of processing logic, circuitry, hardware, and/or other components configured to support replication or copying of data records from one or more source database systems 102 to the backup database 128 to provide remote access to data records maintained in the data tables 130 at the backup database 128 when a source database system 102 is unavailable. Although not illustrated in FIG. 1, in practice, the backup database system 104 may include any number of servers in concert with a load balancer that manages the distribution of network traffic across different servers 126 of the destination database system 104. The backup server 126 generally includes at least one processing system 114, which may be implemented using any suitable processing system and/or device, such as, for example, one or more processors, central processing units (CPUs), controllers, microprocessors, microcontrollers, processing cores, application-specific integrated circuits (ASICs) and/or other hardware computing resources configured to support the operation of the processing system described herein.

The backup server 126 also includes or otherwise accesses a data storage element 134 (or memory) that may be realized as any suitable non-transitory short or long term data storage or other computer-readable media, and/or any suitable combination thereof. In exemplary implementations, the memory 134 stores code or other computer-executable programming instructions that, when executed by the processing system 132, are configurable to cause the processing system 132 to create, generate, or otherwise facilitate a replication service 138 and a replication monitoring service 140 that are configurable to support the subject matter described herein. As described above, although FIG. 1 depicts the services 138, 140 as separate or distinct components, in practice, the services 138, 140 may be integrated, incorporated, or otherwise combined and the services 138, 140 may include or otherwise be associated with any number of different worker threads or nodes configurable to support aspects of their associated functionality in parallel or concurrently.

The destination replication service 138 receives or otherwise obtains the batched entries pushed by the source replication service 118 and stores or otherwise maintains the replicated copy of those entries in memory 134 before writing or otherwise committing the replicated entries 142 to the backup database 128. In this regard, in one or more implementations, the destination replication service 138 writes or otherwise adds the replicated entries 142 to a WAL 144 in the backup database 128 before permanently writing the corresponding changes, edits or other mutations to the appropriate data records in the data tables 130 at the backup database 128. In exemplary implementations, the destination replication service 138 detects or otherwise identifies the tracker entries that were inserted by the tracker insertion service 120 within the replicated entries 142 and writes or otherwise adds the tracker entries to a corresponding log or table 146 at the backup database 128.

The replication monitoring service 140 is configurable to detect or otherwise identify occurrence of a replication anomaly based on the tracker entries maintained in the tracking log 146 at the backup database 128. Depending on the implementation, the replication monitoring service 140 may be configurable to analyze the tracking log 146 asynchronously (e.g., to detect a replication anomaly substantially in real-time) or synchronously at periodic intervals (e.g., to detect a replication anomaly within a preceding interval of time). For example, the replication monitoring service 140 may calculate or otherwise determine an expected timestamp for when a tracking entry associated with a particular WAL 122 and/or region server 108 at a source database system 102 is expected to be inserted and/or received based on the time difference between preceding tracking entries associated with that particular WAL 122 and/or region server 108 or using tracker insertion frequency criteria defined for the particular region server 108 and/or source database system 102. In this regard, if the tracker insertion service 120 at the region server 108 is configured to insert tracking entries every thirty seconds, the replication monitoring service 140 may calculate or otherwise determine an expected timestamp for when the next tracking entry associated with the active WAL 122 at the region server 108 is expected to occur by adding thirty seconds to the timestamp associated with the most recently observed tracking entry associated with the active WAL 122 at the region server 108. Thereafter, in response to the absence of a tracking entry associated with that particular WAL 122 at the region server 108 at or within a threshold period of time after the expected timestamp, the replication monitoring service 140 may detect or otherwise identify occurrence of a replication anomaly with respect to that WAL 122 at the region server 108. In this regard, the detection threshold period of time utilized to detect the replication anomaly may be configurable to provide a buffer amount of time that accounts for transmission delay or other lag associated with the replication to account for the likely or reasonable amount of time that could elapse in the absence of an anomaly between when the tracking entry is expected to occur at the source side and when it would be expected to be observed at the destination side.

In one or more implementations, when the replication monitoring service 140 detects a replication anomaly, the replication monitoring service 140 automatically initiates one or more remedial actions to facilitate resolving the replication anomaly. For example, in some implementations, the replication monitoring service 140 may automatically generate or otherwise provide a user notification at a client device 150 (e.g., by pushing the user notification over the network 106) that prompts a user of the client device 150 to utilize a client application 152 at the client device 150 to access or otherwise login to the replication monitoring service 140 to initiate debugging, repairs or other actions to mitigate the replication anomaly. In this regard, the client device 150 may be realized as any sort of personal computer, mobile telephone, tablet or other network-enabled electronic device coupled to the network 106 that executes or otherwise supports a web browser or other client application 152 that allows a user to access one or more GUI displays provided by the replication monitoring service 140. Additionally, in some implementations, the replication monitoring service 140 may automatically create an entry associated with a detected replication anomaly in a table or log at the backup database system 104 (e.g., in the database 128 or in memory 134) that includes metadata associated with the detected replication anomaly derived from the tracking log 146 and/or the WAL event tracking table. For example, the replication monitoring service 140 may include or otherwise incorporate processing logic capable of analyzing the entries in the WAL event tracking table associated with the particular region server 108 and/or WAL 122 associated with the missing expected tracking entry and utilize the timestamps or other metadata associated with the preceding tracking entries associated with the particular region server 108 and/or WAL 122 in relation to the timestamps associated with the entries in the WAL event tracking table to identify when the replication anomaly likely occurred, whether the replication anomaly is related to a WAL event, and/or the like.

In one or more implementations, a user of the client device 150 may utilize one or more GUI displays and corresponding GUI elements generated by the replication monitoring service 140 within the client application 152 to manually review and analyze the entries in the tracking log 146 and/or the WAL event tracking tables associated with different region servers 108 and/or source database systems 102 to manually debug and trace a detected replication anomaly to a particular region server 108, a particular WAL 122, a particular range or time period of entries in the particular WAL 122 and/or the like. In this regard, a GUI display generated by the replication monitoring service 140 may include one or more GUI elements that are manipulable or selectable by a user to manually reconfigure, command or otherwise interact with the replication service(s) 118, 132 to resolve the replication anomaly. In this manner, a user may manually reinitiate or reconfigure replication of a particular WAL 122 (or a subset or range of entries contained therein) from the source database system 102 to the destination database system 104 to ensure that all of the entries in that particular WAL 122 are replicated to the destination database system 104 and the corresponding changes or mutations applied at the data tables 130 in the backup database 128. That said, in some implementations, the replication monitoring service 140 may include or incorporate processing logic configurable to automatically reinitiate replication using the metadata maintained in the tracking log 146 and/or the WAL event tracking tables.

Figure 2:
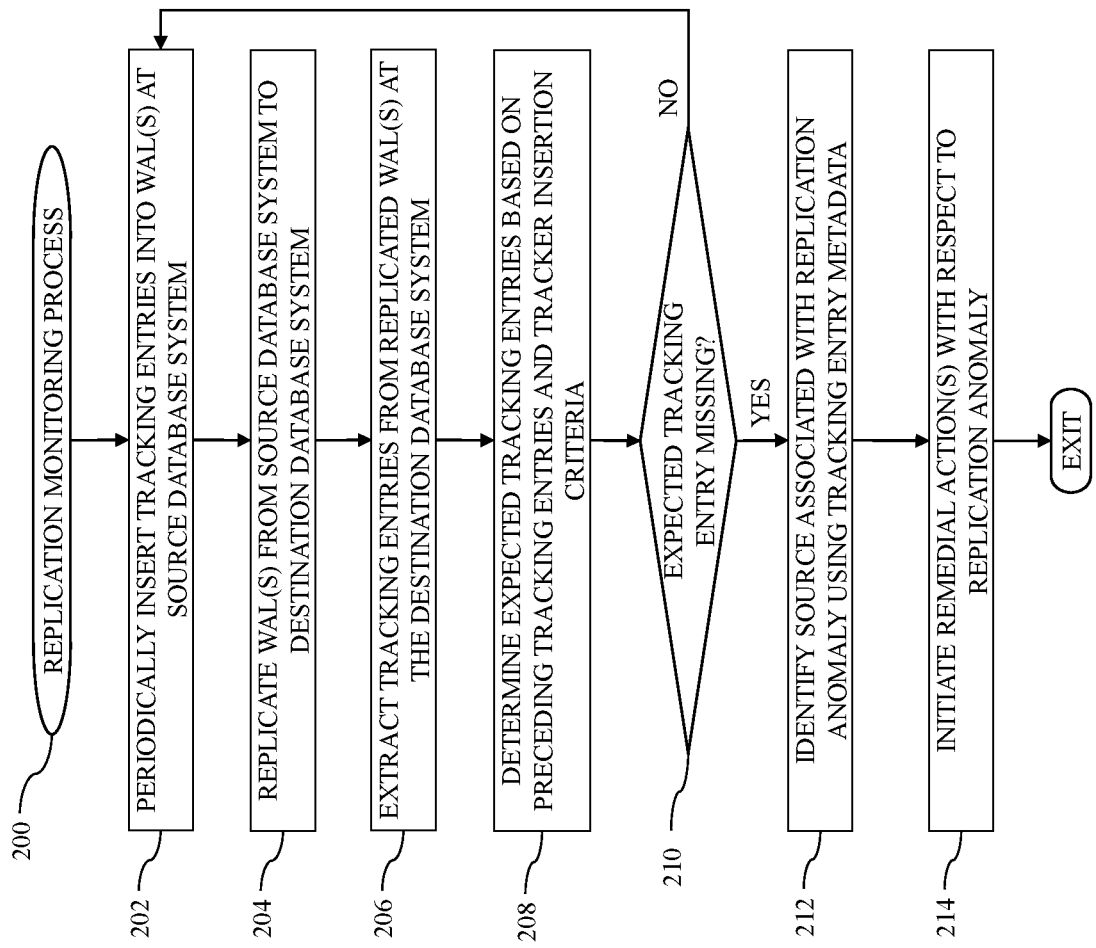
FIG. 2 is a flow diagram illustrating a replication monitoring process suitable for use with the replication monitoring service in the system of FIG. 1 according to some example implementations.

FIG. 2 depicts an exemplary replication monitoring process 200 that may be implemented or otherwise performed in connection with a computing system to monitor replication between systems over a communications network to detect replication anomalies and perform additional tasks, functions, and/or operations described herein. For illustrative purposes, the following description may refer to elements mentioned above in connection with FIG. 1. It should be appreciated that the replication monitoring process 200 may include any number of additional or alternative tasks, the tasks need not be performed in the illustrated order and/or the tasks may be performed concurrently, and/or the replication monitoring process 200 may be incorporated into a more comprehensive procedure or process having additional functionality not described in detail herein. Moreover, one or more of the tasks shown and described in the context of FIG. 2 could be omitted from a practical implementation of the replication monitoring process 200 as long as the intended overall functionality remains intact.

Referring to FIG. 2 with continued reference to FIG. 1, for a given matching rule of interest, the replication monitoring process 200 begins by periodically inserting tracking entries into WALs at a source database system for subsequent replication to a destination database system (task 202). As described above, a tracker insertion service 120 executing at a region server 108 of a source database system 102 may be configured to periodically write or otherwise insert tracking entries into an active WAL 122 maintained in a data table 112 of a database 110 associated with the source database system 102. In this regard, the tracker insertion frequency at which the tracking entries are created (or the time interval between tracking entry creation) may be configurable by a user (e.g., via a client application 152 at a client device 150) to create tracking entries with a desired time period between successive tracking entries (e.g., 30 seconds, 5 minutes, or the like), where increasing the frequency (or decreasing the periodic insertion time interval) enables detection of replication anomalies closer to real-time and/or facilitates tracing a replication anomaly to having occurred within a narrower window of time. As described above, each tracking entry includes metadata that enables identification of the source or location where the tracking entry originated and when the tracking entry was created, such as, for example, the identifier associated with the region server 108, the identifier associated with the active WAL 122 the tracking entry was written to, the offset or location within the active WAL 122 where the tracking entry was written and the timestamp corresponding to the current time when the tracking entry was created.

The replication monitoring process 200 continues by batching, copying or otherwise replicating the active WAL including the inserted tracking entries from the source database system to the destination database system where the tracking entries can be extracted from the replicated WAL entries at the destination database system (tasks 204, 206). For example, as described above, the source replication service 118 may periodically and/or asynchronously tail the active WAL 122 and batch new entries yet to be replicated to memory 116 associated with the region server 108 before pushing or otherwise transmitting the batched entries 124 to a counterpart destination-side replication service 138. The destination-side replication service 138 stores the replicated entries 142 in memory 134 associated with the destination server 126 before writing the replicated entries 142 to an active WAL 144 at the destination database 128, and thereafter writing the changes from the active WAL 144 to other data records maintained in other data tables 130 at the destination database 128. As described above, in exemplary implementations, the tracking entries are tagged, marked, or otherwise configured such that the destination replication service 138 writes the subset of tracking entries from the replicated entries 142 and/or the active WAL 144 at the destination database system 104 to a tracking log 146 or table that maintains tracking entries from any number of different instances of the source database system 102 and/or region server 108.

Still referring to FIG. 2, the replication monitoring process 200 calculates or otherwise determines when expected tracking entries are expected to occur and be observed at the destination side based on preceding tracking entries and the tracker insertion frequency criteria and detects or otherwise identifies an anomaly in the absence of observing the expected tracking entry at the destination side within a threshold period of time (tasks 208, 210). For example, as described above, for a given region server 108 or source-side WAL 122 having existing tracking entries in the tracking log 146, the replication monitoring service 140 may calculate or otherwise determine an expected timestamp for the next expected tracking entry to be received for that region server 108 and/or WAL 122. In some implementations, the replication monitoring service 140 may determine the expected time stamp based on the observed time interval between preceding tracking entries associated with that region server 108 and/or WAL 122, for example, by averaging the time difference between successive pairs of preceding tracking entries associated with that region server 108 and/or WAL 122 and then adding the average tracker insertion interval to the timestamp value for the most recent tracking entry associated with that region server 108 and/or WAL 122. Alternatively, the replication monitoring service 140 may identify or otherwise obtain the configured tracker insertion frequency for the tracker insertion service 120 and add the corresponding value for the tracker insertion time period between successive tracking entries to the timestamp value for the most recent tracking entry associated with that region server 108 and/or WAL 122. Once the current time is after the expected timestamp value, the replication monitoring service 140 may detect a replication anomaly with respect to that region server 108 and/or WAL 122 in response to the absence of observing a tracking entry associated with that region server 108 and/or WAL 122 having an associated timestamp value that is equal to (or within a threshold) of the expected timestamp value. In exemplary implementations, the replication monitoring service 140 waits until the current time is at least a detection threshold period of time after the expected timestamp value before detecting a replication anomaly to account for lag or other transmission delays associated with replicating data between database systems 102, 104 over the network 106 that are incidental to and independent of the functionality of the replication services 118, 138.

In response to the absence of receiving an expected tracking entry within a detection threshold period of time of the expected timestamp to be associated with the expected tracking entry, the replication monitoring process 200 detects occurrence of a replication anomaly and identifies the source associated with the replication anomaly using the tracking entry metadata (task 212). In this regard, the replication monitoring service 140 obtains, from the tracking log 146, the identifier associated with the region server 108 and/or the identifier associated with the WAL 122 for which an expected tracking entry was not received at or within a threshold of the expected timestamp to be associated with that expected tracking entry. Thereafter, the replication monitoring process 200 automatically initiates one or more remedial actions with respect to the detected replication anomaly (task 214). For example, the replication monitoring service 140 may automatically push a graphical user notification to the client device 150 or generate or otherwise provide a GUI display within the client application 152 at the client device 150 that includes an indication that a replication anomaly was detected with respect to the particular region server 108 and/or the particular WAL 122 using the associated identifier(s) obtained from the tracking log 146. In some implementations, the replication monitoring service 140 automatically attempts to resolve the replication anomaly and repair the replicated data, for example, by reinitiating the replication service 118 at the source database system 102 replicating entries from the particular WAL 122 and/or the particular region server 108 associated with the replication anomaly. In this regard, in some implementations, the replication monitoring service 140 may utilize the offset value(s) and the associated timestamp(s) for the tracking entries associated with the particular WAL 122 and/or the particular region server 108 to configure the replication service 118 to attempt to replicate only a subset of the entries in the particular WAL 122 that were likely to be impacted by the replication anomaly, rather than repeating replication of the entirety of that WAL 122. That said, in other implementations, the replication monitoring service 140 may utilize the tracking metadata in the tracking log 146 and the WAL event metadata in the WAL event tracking table to generate one or more GUI displays within the client application 152 at the client device 150 that allow a user of the client device 150 to debug, trace and repair a replication anomaly manually.

FIG. 3 depicts an exemplary log 300 of tracking entries that could be inserted into WALs 122 and associated with a particular region server 108 (RS-0) and FIG. 4 depicts a corresponding WAL event tracking table 400 associated with that region server 108. In this regard, FIG. 3 depicts an example where the tracker insertion service 120 is configured to periodically insert tracking entries every thirty seconds. As shown in FIG. 4, a first WAL 122 (WAL-0) is initiated at time 0. Thereafter, as shown in FIG. 3, at time t0, a first tracking entry is inserted into the first WAL 122 that includes metadata identifying the region server 108 (RS-0), the WAL 122 it was inserted to (WAL-0) and the offset value for where it was inserted to (90) into WAL-0. Thereafter, as shown in FIG. 4, nineteen seconds after time t0 (t0+19), the first WAL 122 is rolled and a new WAL 122 (WAL-0) is created at time t0+21 seconds. Thirty seconds after the first tracking entry, the tracker insertion service 120 inserts a tracking entry into the second WAL 122 (WAL-1) at time t0+30 and an offset value of 1000. Thereafter, the second WAL 122 is rolled and the next tracking entry is inserted into the third WAL 122 (WAL-2) at time t0+60 and an offset value of 100.

At the destination side, the replication monitoring service 140 monitors the tracking entries received from the RS-0 region server 108 to determine when the next expected tracking entry is expected to be received and detects a replication anomaly when an expected tracking entry is not received at or within a detection threshold amount of time from when the tracking entry was expected to be observed. For example, after receiving the first tracking entry associated with the RS-0 region server 108 at time t0, based on the tracker insertion frequency interval of 30 seconds, the replication monitoring service 140 determines the next expected tracking entry should be received at or around time t0+30. In this regard, when the second tracking entry for the RS-0 region server 108 is not received at the destination database system 104, the replication monitoring service 140 may utilize the metadata associated with the most recently received tracking entry and the metadata in the WAL event tracking table 400 to determine that the replication anomaly likely occurred between time t0 and t0+30 and potentially affected entries having offset locations from through 500 of rolled WAL-0 in addition to any entries in the currently active WAL-1. In response, the replication monitoring service 140 may automatically reinitiate replication of the entries in the rolled WAL-0 from offset location 90 onward while also reinitiating replication of the entries in the currently active WAL-1. On the other hand, when the expected tracking entry is received for time t0+30, the replication monitoring service 140 determines the next expected tracking entry should be received at or around time t0+60. When the third tracking entry for the RS-0 region server 108 is not received at the destination database system 104, the replication monitoring service 140 may utilize the metadata associated with the most recently received tracking entry and the metadata in the WAL event tracking table 400 to determine that the replication anomaly likely occurred between time t0+30 and t0+60 and potentially affected entries having offset locations from 1000 through 1500 of rolled WAL-1 in addition to any entries in the currently active WAL-2. In response, the replication monitoring service 140 may automatically reinitiate replication of the entries in the rolled WAL-1 from offset location 1000 onward while also reinitiating replication of the entries in the currently active WAL-2. In this manner, the metadata maintained in the tracking log 300 and the WAL event tracking table 400 may be utilized to debug and trace the replication anomaly to a particular region server 108 and particular WALs 122 that were potentially affected at that region server 108, and furthermore, narrow down the range of entries in the affected WALs 122 to reduce the amount of data that is redundantly replicated over the network 106. Thus, the MTTD and the MTTR for a replication anomaly can be reduced, even in distributed computing systems including multiple different region clusters (or source database systems), where each region cluster may have multiple different parallel executing worker nodes associated with the replication service at the respective region cluster.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 5A:
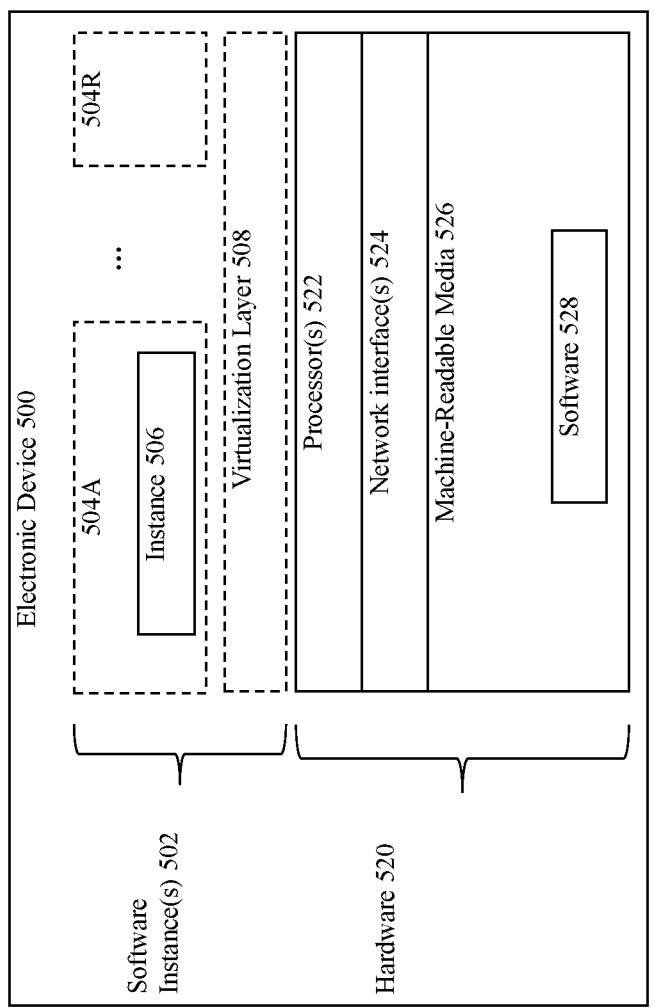
FIG. 5A is a block diagram illustrating an electronic device according to some example implementations.

FIG. 5A is a block diagram illustrating an electronic device 500 according to some example implementations. FIG. 5A includes hardware 520 comprising a set of one or more processor(s) 522, a set of one or more network interfaces 524 (wireless and/or wired), and machine-readable media 526 having stored therein software 528 (which includes instructions executable by the set of one or more processor(s) 522). The machine-readable media 526 may include non-transitory and/or transitory machine-readable media. Each of the previously described clients and the tracker insertion service and/or the replication monitoring service may be implemented in one or more electronic devices 500. In one implementation: 1) each of the clients is implemented in a separate one of the electronic devices 500 (e.g., in end user devices where the software 528 represents the software to implement clients to interface directly and/or indirectly with the tracker insertion service and/or the replication monitoring service (e.g., software 528 represents a web browser, a native client, a portal, a command-line interface, and/or an application programming interface (API) based upon protocols such as Simple Object Access Protocol (SOAP), Representational State Transfer (REST), etc.)); 2) the tracker insertion service and/or the replication monitoring service is implemented in a separate set of one or more of the electronic devices 500 (e.g., a set of one or more server devices where the software 528 represents the software to implement the tracker insertion service and/or the replication monitoring service); and 3) in operation, the electronic devices implementing the clients and the tracker insertion service and/or the replication monitoring service would be communicatively coupled (e.g., by a network) and would establish between them (or through one or more other layers and/or or other services) connections for submitting requests to the tracker insertion service and/or the replication monitoring service. Other configurations of electronic devices may be used in other implementations (e.g., an implementation in which the client and the tracker insertion service and/or the replication monitoring service are implemented on a single one of electronic device 500).

During operation, an instance of the software 528 (illustrated as instance 506 and referred to as a software instance; and in the more specific case of an application, as an application instance) is executed. In electronic devices that use compute virtualization, the set of one or more processor(s) 522 typically execute software to instantiate a virtualization layer 508 and one or more software container(s) 504A-504R (e.g., with operating system-level virtualization, the virtualization layer 508 may represent a container engine (such as Docker Engine by Docker, Inc. or rkt in Container Linux by Red Hat, Inc.) running on top of (or integrated into) an operating system, and it allows for the creation of multiple software containers 504A-504R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-504R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 528 is executed within the software container 504A on the virtualization layer 508. In electronic devices where compute virtualization is not used, the instance 506 on top of a host operating system is executed on the "bare metal" electronic device 500. The instantiation of the instance 506, as well as the virtualization layer 508 and software containers 504A-504R if implemented, are collectively referred to as software instance(s) 502.

Alternative implementations of an electronic device may have numerous variations from that described above. For example, customized hardware and/or accelerators might also be used in an electronic device.

Figure 5B:
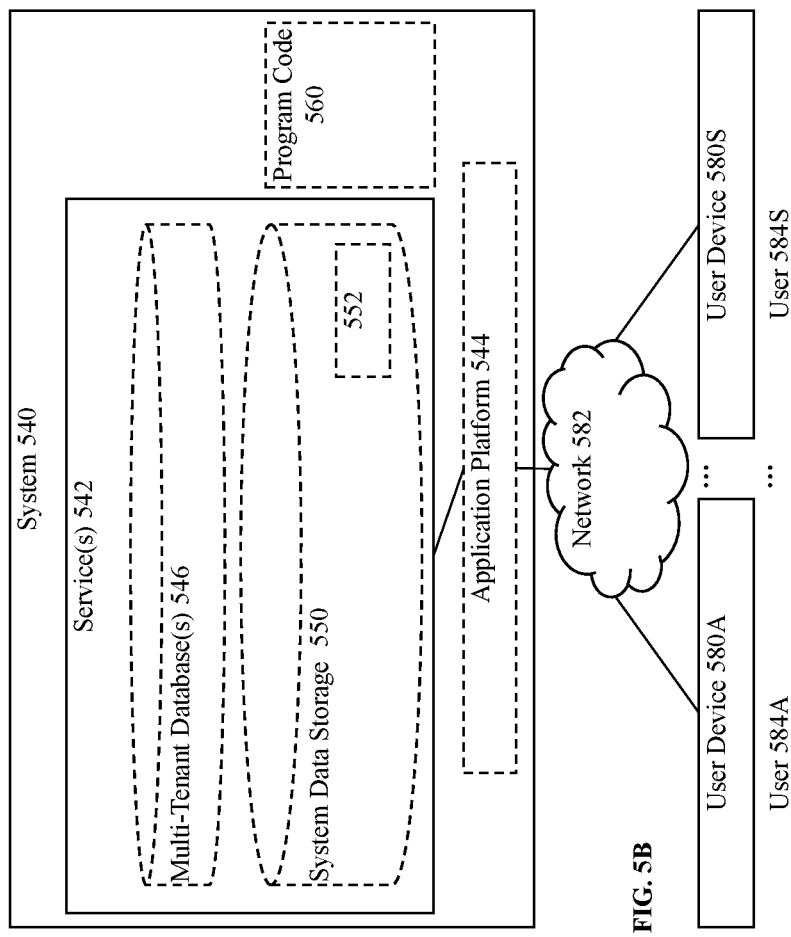
FIG. 5B is a block diagram of a deployment environment according to some example implementations.

FIG. 5B is a block diagram of a deployment environment according to some example implementations. A system 540 includes hardware (e.g., a set of one or more server devices) and software to provide service(s) 542, including the tracker insertion service and/or the replication monitoring service. In some implementations the system 540 is in one or more datacenter(s). These datacenter(s) may be: 1) first party datacenter(s), which are datacenter(s) owned and/or operated by the same entity that provides and/or operates some or all of the software that provides the service(s) 542; and/or 2) third-party datacenter(s), which are datacenter(s) owned and/or operated by one or more different entities than the entity that provides the service(s) 542 (e.g., the different entities may host some or all of the software provided and/or operated by the entity that provides the service(s) 542). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 540 is coupled to user devices 580A-580S over a network 582. The service(s) 542 may be on-demand services that are made available to one or more of the users 584A-584S working for one or more entities other than the entity which owns and/or operates the on-demand services (those users sometimes referred to as outside users) so that those entities need not be concerned with building and/or maintaining a system, but instead may make use of the service(s) 542 when needed (e.g., when needed by the users 584A-584S). The service(s) 542 may communicate with each other and/or with one or more of the user devices 580A-580S via one or more APIs (e.g., a REST API). In some implementations, the user devices 580A-580S are operated by users 584A-584S, and each may be operated as a client device and/or a server device. In some implementations, one or more of the user devices 580A-580S are separate ones of the electronic device 500 or include one or more features of the electronic device 500.

In some implementations, the system 540 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 540 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 540 may include an application platform 544 that enables PAAS for creating, managing, and executing one or more applications developed by the provider of the application platform 544, users accessing the system 540 via one or more of user devices 580A-580S, or third-party application developers accessing the system 540 via one or more of user devices 580A-580S.

In some implementations, one or more of the service(s) 542 may use one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user devices 580A-580S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the multi-tenant database(s) 546 and/or system data storage 550.

In some implementations, the service(s) 542 are implemented using virtual applications dynamically created at run time responsive to queries from the user devices 580A-580S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including the tracker insertion service and/or the replication monitoring service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a third Generation Partnership Project (3GPP) protocol, a fourth generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 540 and the user devices 580A-580S.

Each user device 580A-580S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow one or more of users 584A-584S to interact with various GUI pages that may be presented to the one or more of users 584A-584S. User devices 580A-580S might communicate with system 540 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 580A-580S might include an HTTP client, commonly referred to as a "browser," for sending and receiving HTTP messages to and from server(s) of system 540, thus allowing users 584A-584S of the user devices 580A-580S to access, process and view information, pages and applications available to it from system 540 over network 582.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A method of monitoring a replication service replicating data from a source database system to a destination database system, the method comprising:

receiving, at the destination database system from the replication service over a network, a set of database transactions, wherein the set of database transactions includes one or more tracking entries periodically inserted into a log of database transactions at the source database system;

determining, at the destination database system, an expected timestamp for an expected tracking entry subsequent to one or more preceding tracking entries in the set of database transactions based at least in part on respective timestamps associated with the one or more preceding tracking entries in the set of database transactions;

detecting, at the destination database system, an anomaly associated with replicating the data from the source database system when a current time is at least a detection threshold period of time after the expected timestamp in response to an absence of receiving the expected tracking entry in a subsequent set of database transactions at the source database system from the replication service; and in response to detecting the anomaly, automatically initiating replication of at least a portion of the log of database transactions following a most recent tracking entry of the one or more preceding tracking entries from the source database system to the destination database system.

2. The method of claim 1, further comprising determining the expected timestamp to be associated with the expected tracking entry based at least in part on an insertion criterion associated with a tracker insertion service at the source database system periodically inserting the one or more tracking entries into the log of database transactions, wherein detecting the anomaly comprises detecting the anomaly in the absence of receiving a tracking entry associated with the log of database transactions within the detection threshold period of time of the expected timestamp.

3. The method of claim 1, wherein detecting the anomaly comprises detecting the anomaly in response to the absence of receiving the expected tracking entry within the detection threshold period of time comprising the expected timestamp plus a buffer amount of time.

4. The method of claim 1, wherein:

the one or more preceding tracking entries include an identifier associated with the log of database transactions; and detecting the anomaly comprises:

monitoring the subsequent set of database transactions for the expected tracking entry including the identifier associated with the log of database transactions; and detecting the anomaly when the subsequent set of database transactions does not include an entry including the identifier associated with the log of database transactions within a threshold period of time after receiving the set of database transactions.

5. The method of claim 1, wherein:
the log of database transactions comprises a write ahead log (WAL) at the source database system;
determining the expected timestamp for the expected tracking entry comprises determining a subsequent tracking entry including an identifier associated with the WAL at the source database system is expected to be received at the destination database system based at least in part on the one or more preceding tracking entries including the identifier associated with the WAL in the set of database transactions; and
detecting the anomaly comprises detecting the anomaly associated with replicating the WAL from the source database system to the destination database system in response to the absence of receiving the subsequent tracking entry including the identifier associated with the WAL within a threshold period of time.

6. The method of claim 5, wherein automatically initiating the replication comprises initiating replication of at least a portion of the WAL at the source database system following the most recent tracking entry of the one or more preceding tracking entries.

7. The method of claim 1, wherein:
the one or more preceding tracking entries include an identifier associated with a region server at the source database system; and
detecting the anomaly comprises detecting the anomaly with respect to the region server in response to the absence of receiving the expected tracking entry including the identifier associated with the region server.

8. The method of claim 1, further comprising determining an expected time window when the anomaly occurred based on the expected timestamp for the expected tracking entry and a timestamp associated with the most recent tracking entry of the one or more preceding tracking entries.

9. The method of claim 1, further comprising generating a user notification of the anomaly at a client device coupled to the destination database system over the network, wherein the user notification comprises indication of at least one of a first identifier associated with a region server at the source database system and a second identifier associated with the log of database transactions.

10. A method of monitoring a replication service replicating data from a source database system to a destination database system, the method comprising:
periodically inserting, at the source database system, a plurality of tracking entries into one or more logs of database transactions at the source database system with a periodic insertion time period between successive tracking entries of the plurality of tracking entries, wherein the replication service is configurable to replicate the one or more logs of database transactions to the destination database system;
receiving, at the destination database system from the replication service, a first subset of database transactions of the one or more logs of database transactions at the source database system, wherein the first subset of database transactions includes one or more tracking entries of the plurality of tracking entries;
determining, at the destination database system, an expected timestamp for an expected tracking entry subsequent to the first subset of database transactions based at least in part on respective timestamps associated with the one or more tracking entries preceding the expected tracking entry in the first subset of database transactions;
detecting, at the destination database system, an anomaly associated with replicating the data from the source database system when a current time is at least a detection threshold period of time after the expected timestamp in response to an absence of receiving, from the replication service, a subsequent subset of database transactions of the one or more logs of database transactions at the source database system that includes the expected tracking entry; and
in response to detecting the anomaly, automatically initiating replication of at least a portion of the one or more logs of database transactions following a most recent tracking entry of the one or more tracking entries from the source database system to the destination database system.

11. The method of claim 10, wherein:
periodically inserting the plurality of tracking entries comprises for each respective tracking entry of the plurality of tracking entries, periodically creating the respective tracking entry in a table of a database at the source database system, wherein the respective tracking entry includes an identifier associated with the source database system; and
detecting the anomaly comprises detecting the anomaly in response to the absence of the expected tracking entry including the identifier associated with the source database system within the subsequent subset of database transactions.

12. The method of claim 11, wherein:
each respective tracking entry of the plurality of tracking entries includes a log identifier associated with a respective log of the one or more logs of database transactions the respective tracking entry is inserted into; and
detecting the anomaly comprises identifying a first log of the one or more logs of database transactions that is associated with the anomaly based on the log identifier associated with the most recent tracking entry of the one or more tracking entries.

13. The method of claim 12, wherein automatically initiating replication of at least the portion of the one or more logs of database transactions comprises initiating the replication service replicating at least a portion of the first log from the source database system to the destination database system.

14. The method of claim 13, wherein:
the most recent tracking entry includes an offset value indicating a location of the most recent tracking entry within the first log; and
the portion of the first log comprises entries having locations within the first log following the location of the most recent tracking entry.

15. The method of claim 12, further comprising providing graphical indication of the first log at the source database system associated with the anomaly on a client device coupled to a network.

16. The method of claim 12, wherein:
the one or more logs of database transactions comprise one or more write ahead logs (WALs) at the source database system; and
identifying the first log comprises identifying a first WAL of the one or more WALs associated with the anomaly.

17. The method of claim 16, wherein:

the most recent tracking entry includes an offset value indicating a location of the most recent tracking entry within the first WAL; and action automatically initiating replication of at least the portion of the one or more logs of database transactions comprises initiating replication of entries at locations within the first WAL following the location of the most recent tracking entry.

18. A computing device comprising:

at least one non-transitory machine-readable storage medium that stores software; and at least one processor, coupled to the at least one non-transitory machine-readable storage medium, to execute the software that implements a replication monitoring service and that is configurable to:

determine an expected timestamp for an expected tracking entry expected to be received from a replication service over a network based on respective timestamps associated with one or more preceding tracking entries in a first set of database transactions at a source database system received from the replication service, wherein the first set of database transactions comprises a subset of one or more logs of database transactions at the source database system and the one or more preceding tracking entries are periodically inserted into the one or more logs of database transactions;

detecting a replication anomaly when a current time is at least a detection threshold period of time after the expected timestamp in response to an absence of receiving, from the replication service, a subsequent set of database transactions at the source database system that includes the expected tracking entry within a threshold period of time; and in response to detecting the replication anomaly, automatically initiating replication of at least a portion of the one or more logs of database transactions following a most recent tracking entry of the one or more preceding tracking entries from the source database system to a destination database system.

19. The computing device of claim 18, wherein the one or more logs of database transactions at the source database system comprise one or more write ahead logs (WALs) at the source database system and the one or more preceding tracking entries are inserted into the one or more WALs at the source database system.

* * * * *